(12) United States Patent
Uchiyama

(10) Patent No.: US 9,067,464 B2
(45) Date of Patent: Jun. 30, 2015

(54) AGRICULTURAL TIRE

(75) Inventor: Masataka Uchiyama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 180 days.

(21) Appl. No.: 13/995,309

(22) PCT Filed: Jan. 18, 2012

(86) PCT No.: PCT/JP2012/050995
§ 371 (c)(1),
(2), (4) Date: Jul. 17, 2013

(87) PCT Pub. No.: WO2012/102154
PCT Pub. Date: Aug. 2, 2012

(65) Prior Publication Data
US 2013/0319588 A1    Dec. 5, 2013

(30) Foreign Application Priority Data

Jan. 25, 2011   (JP) ................... 2011-013334

(51) Int. Cl.
*B60C 3/04*      (2006.01)
*B60C 9/08*      (2006.01)
(Continued)

(52) U.S. Cl.
CPC ............ *B60C 9/0292* (2013.01); *B60C 2200/08* (2013.01); *B60C 3/04* (2013.01); *B60C 9/28* (2013.01)

(58) Field of Classification Search
CPC .......... B60C 9/0292; B60C 9/28; B60C 3/04; B60C 3/00; B60C 13/003; B60C 2200/08
USPC ....................................................... 152/454
See application file for complete search history.

(56) References Cited

U.S. PATENT DOCUMENTS 4,282,918 A * 8/1981 Tomoda et al. ............... 152/510
5,027,876 A * 7/1991 Chrobak et al. ......... 152/209.14
(Continued)

FOREIGN PATENT DOCUMENTS

CN    101531121 A       9/2009
JP    03-189206    *    8/1991
(Continued)

OTHER PUBLICATIONS

International Search Report of PCT/JP2012/050995 dated Apr. 24, 2012.
(Continued)

*Primary Examiner* — Justin Fischer
*Assistant Examiner* — Robert Dye
(74) *Attorney, Agent, or Firm* — Sughrue Mion, PLLC

(57) ABSTRACT

It is an object to ensure the strength of a carcass line, enhance durability with respect to high applied loads, and be able to suppress the input of compressive force with respect to a carcass ply without increasing mass and cost. When W denotes a distance from a tire equatorial plane (CL) to a tire axial direction outermost point (P) of a carcass body portion (22C) and D denotes a tire radial direction height from bead base portions (30) to a carcass body portion (22A) at the tire equatorial plane (CL), a radius of curvature (R1) of a carcass ply (12) in a range from the tire equatorial plane (CL) to a position (P1) located 0.6 W away from the tire equatorial plane (CL) in the tire axial direction, a radius of curvature (R2) of a carcass body portion (22B) in a range from the position (P1) to a position (P2) located 0.7 D on the tire radial direction outer side from bead base portions (30), and a radius of curvature (R3) of the carcass body portion (22C) in a range from the position (P2) to a position (P3) located 0.3 D on the tire radial direction outer side from the bead base portions are such that $0.07 \leq R2/R1 \leq 0.11$ and $0.5 \leq R2/R3 \leq 0.7$.

2 Claims, 1 Drawing Sheet

(51) Int. Cl.
*B60C 9/02* (2006.01)
*B60C 9/28* (2006.01)

(56) References Cited

U.S. PATENT DOCUMENTS

| 5,042,545 | A | * | 8/1991 | Kabe et al. | 152/454 |
| 5,565,047 | A | * | 10/1996 | Tanaka | 152/454 |
| 2009/0139631 | A1 | | 6/2009 | Duchemin et al. | |

FOREIGN PATENT DOCUMENTS

| JP | 3-262708 | A | | 11/1991 |
| JP | 6-156011 | A | | 6/1994 |
| JP | 08-142602 | | * | 6/1996 |
| JP | 8-142602 | A | | 6/1996 |
| JP | 11-011107 | A | | 1/1999 |
| JP | 11-291710 | A | | 10/1999 |
| JP | 2008105656 | A | | 5/2008 |
| JP | 2009-513429 | A | | 4/2009 |
| JP | 2009-286177 | A | | 12/2009 |

OTHER PUBLICATIONS

Communication dated Feb. 12, 2015 from the State Intellectual Property Office of People's Republic of China in counterpart Application No. 201280005054.6.

* cited by examiner

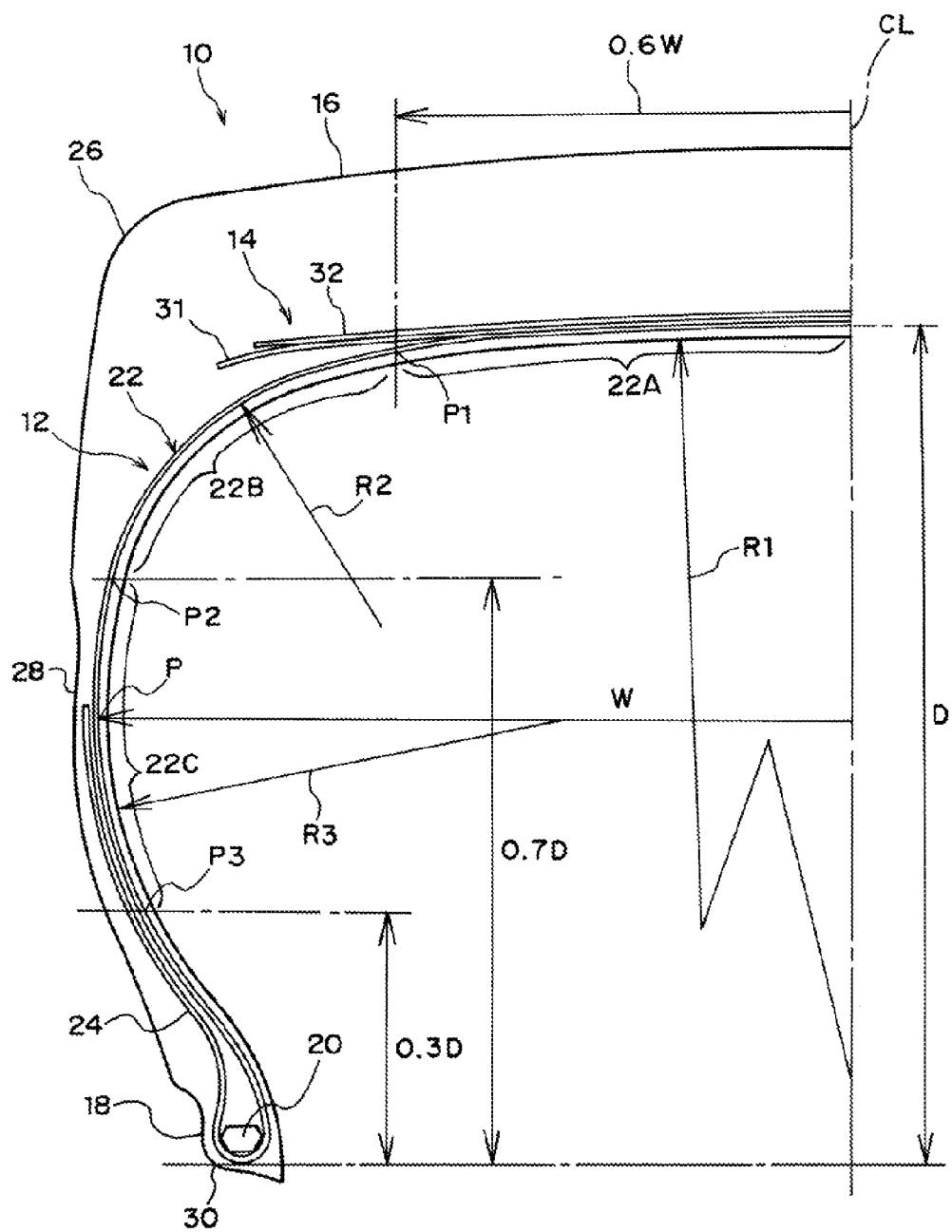

AGRICULTURAL TIRE

CROSS REFERENCE TO RELATED APPLICATIONS

This application is a National Stage of International Application No. PCT/JP2012/050995 filed Jan. 18, 2012, claiming priority based on Japanese Patent Application No. 2011-013334, filed Jan. 25, 2011, the contents of all of which are incorporated herein by reference in their entirety.

TECHNICAL FIELD

The present invention pertains to an agricultural tire and particularly relates to an agricultural tire having superior carcass ply durability.

BACKGROUND ART

In regard to the shape (carcass line) of a carcass ply in a tire axial direction cross section, structures combining plural carcass lines having different radii of curvature have been disclosed (see patent documents 1 and 2). Further, a technology that improves fatigue resistance with respect to compression input by optimizing the twist structure of steel cords used in carcass plies has also been disclosed (see patent document 3).
Patent Document 1: JP-A No. 6-156011
Patent Document 2: JP-A No. 8-142602
Patent Document 3: JP-A No. 11-11107

SUMMARY OF INVENTION

Technical Problem

However, the conventional examples pertaining to patent documents 1 and 2 cited above pertain to passenger car tires and have the object of improving uneven wear resistance, fuel economy, and riding comfort, so they have different intended purposes and conditions of use from those of agricultural tires. Agricultural tires are tires used to travel on soft soil, such as fields, and not hard roads. Further, agricultural tires have a lug pattern tread shape and are used at a lower pressure than passenger car tires in order to generate traction and move forward by penetrating soft soil.

In accompaniment with the increase in the size of agricultural vehicles, the loads applied to the tires mounted thereon have also increased. Examples of measures to cope with this include raising the internal pressure of the tire and increasing the tire size. Of these measures, there is a limit on how much the internal pressure of the tire can be raised, because raising the internal pressure of the tire results in lowered traction in fields and an increase in damage to fields caused by soil compaction. Consequently, it is common to increase the tire size as a way to respond to high applied loads on the tire.

In order to ensure traction in fields and reduce damage to fields caused by soil compaction, tires for agricultural work vehicles are used at a low internal pressure. Consequently, it is common for the carcass plies of such tires to be carcass plies using organic filament.

The tensile strength of the cords in an organic filament carcass ply is not very high, so in accompaniment with the increase in the size of the tire, strength with respect to the internal pressure applied to the tire becomes insufficient. In order to eliminate this, generally strength is ensured by disposing plural layers of carcass plies. However, when the tire increases in size, more carcass plies become necessary, which leads to an increase in the weight of the tire.

In order to ensure carcass cord strength, there is also the means of applying steel cords that are higher in strength. However, in agricultural work vehicles whose tires are used at a low internal pressure, compressive force acts on the carcass cords. Steel cords are susceptible to this compressive force. In order to apply steel cords to carcass cords, there exists the technology described in patent document 3 cited above, for example, but there is a limit on applying steel cords to carcass cords in tires of a structure where compressive force that is larger than assumed acts.

In consideration of the above circumstances, it is an object of the present invention to ensure the strength of a carcass line, enhance durability with respect to high applied loads, and be able to suppress the input of compressive force with respect to a carcass ply without increasing mass and cost.

Solution to Problem

A first aspect of the present invention is an agricultural tire comprising: at least one carcass ply in which steel cords are used as carcass cords and which has a carcass body portion that toroidally bridges bead portions on both tire axial direction sides and has turn-up portions that are turned up on outer sides in the bead portions; at least two belt layers in which steel cords are used as belt cords and which are disposed on a tire radial direction outer side of a crown region of the carcass ply; and a tread portion that is disposed on the tire radial direction outer side of the belt layers, wherein a sum total of a surface area of a tire pattern is equal to or less than 40% of a product of a tire tread width and a tire perimeter, the tire has an aspect ratio of 65% to 75%, and when, in a no-load state in which the tire is mounted on a normal rim and no internal pressure is being applied to the tire, W denotes a distance from a tire equatorial plane to a tire axial direction outermost point of the carcass body portion, D denotes a tire radial direction height from bead base portions to the carcass body portion at the tire equatorial plane, R1 denotes a radius of curvature of the carcass ply in a range from the tire equatorial plane to a position P1 located 0.6 W away from the tire equatorial plane in the tire axial direction, R2 denotes a radius of curvature of the carcass body portion in a range from the position P1 to a position P2 located 0.7 D on the tire radial direction outer side from the bead base portions, and R3 denotes a radius of curvature of the carcass body portion in a range from the position P2 to a position P3 located 0.3 D on the tire radial direction outer side from the bead base portions, and R1, R2, and R3 are such that $0.07 \leq R2/R1 \leq 0.11$ and $0.5 \leq R2/R3 \leq 0.7$.

When forces acting on a tire are separated in the tire circumferential direction, the tire radial direction, and the tire width direction, the forces in the tire circumferential direction are mainly produced by the driving/braking force of the vehicle, the forces in the tire radial direction are mainly produced by the internal pressure applied to the tire and the vertical direction load resulting from the weight of the vehicle, and the forces in the tire width direction are produced by the internal pressure applied to the tire and lateral force at times when the vehicle makes a turn.

The forces in the tire circumferential direction act substantially perpendicularly with respect to the carcass ply, so they do not produce tensile or compressive force with respect to the carcass ply.

The forces in the tire radial direction produce tensile and compressive force in the vicinity of the tire sidewall portion, and particularly the vertical direction load produced by the weight of the vehicle produces compressive force in the carcass ply. This acts greatly in the range of 30% to 70% of the tire radial direction height D of the carcass body portion at the tire equatorial plane, that is, at the position where the carcass line of the carcass body portion extends in the tire radial direction.

The forces in the tire width direction produce tensile and compressive force in the vicinity of the tire equatorial plane, and particularly lateral force at times when the vehicle makes a turn produces compressive force in the carcass body portion in the vicinity of the tire equatorial plane. This acts greatly right under the tread portion, where the tire comes into contact with road surfaces, and in the range of 0% to 60% of the distance W from the tire equatorial plane to the tire axial direction outermost point of the carcass body portion, that is, at the position where the carcass line of the carcass body portion extends in the tire axial direction.

Further, the tire deforms because of the internal pressure applied to the tire and the vertical direction load, and bending force also acts on the carcass ply. The bending stress of the carcass ply (carcass body portion) generally becomes a maximum in the vicinity of the tire sidewall portion from the tire shoulder portion.

Here, the reason R2/R1—which is the radius of curvature R2 of a carcass body portion in the vicinity of a tire shoulder portion divided by the radius of curvature R1 of the carcass body portion in the vicinity of the tire equatorial plane CL—is made equal to or greater than 0.07 is because when R2/R1 is less than 0.07, the radius of curvature R2 in the vicinity of the tire shoulder portion ends up becoming relatively smaller, and tensile force acting with respect to the carcass body portion in the vicinity of the tire shoulder portion when internal pressure is being applied to the tire becomes smaller. In this case, because of the bending force produced by the deformation of the tire caused by the vertical direction load, eventually compressive force acts on the section inside the bend of the carcass body portion in the vicinity of the tire shoulder portion and causes fracturing of the carcass ply in the vicinity of the tire shoulder portion.

Further, the reason R2/R1 is made equal to or less than 0.11 is because when R2/R1 exceeds 0.11, conversely the radius of curvature R1 of the carcass body portion in the vicinity of the tire equatorial plane CL ends up becoming relatively smaller, and tensile force acting with respect to the carcass body portion in the vicinity of the tire equatorial plane CL when internal pressure is being applied to the tire becomes smaller. In this case, because of lateral force produced at times when the vehicle makes a turn, eventually compressive force acts on the carcass body portion in the vicinity of the tire equatorial plane CL and causes fracturing of the carcass ply in the vicinity of the tire equatorial plane CL.

Next, the reason R2/R3—which is the radius of curvature R2 of the carcass body portion in the vicinity of the tire shoulder portion divided by the radius of curvature R3 of the carcass body portion in the vicinity of the tire sidewall portion—is made equal to or greater than 0.5 is because when R2/R3 is less than 0.5, the radius of curvature R2 in the vicinity of the tire shoulder portion ends up becoming relatively smaller, and tensile force acting with respect to the carcass body portion in the vicinity of the tire shoulder portion when internal pressure is being applied to the tire becomes smaller. In this case, because of the bending force produced by the deformation of the tire caused by the vertical direction load, eventually compressive force acts on the section inside the bend of the carcass body portion in the vicinity of the tire shoulder portion and causes fracturing of the carcass ply in the vicinity of the tire shoulder portion 26.

Further, the reason R2/R3 is made equal to or less than 0.7 is because when R2/R3 exceeds 0.7, conversely the radius of curvature R3 in the vicinity of the tire sidewall portion ends up becoming relatively smaller, and tensile force acting with respect to the carcass body portion in the vicinity of the tire sidewall portion when internal pressure is being applied to the tire becomes smaller. In this case, because of the vertical direction load, eventually compressive force acts on the carcass body portion in the vicinity of the tire sidewall portion and causes fracturing of the carcass ply in the vicinity of the tire sidewall portion.

The agricultural tire pertaining to the first aspect can mitigate the input of compression to the carcass ply at times when the vehicle makes a turn and can improve turning durability by allowing large tensile tension to act with respect to the carcass body portion in the vicinity of the tire equatorial plane CL whose radius of curvature is R1. Further, the agricultural tire can mitigate the input of compression to the carcass ply during travel overall, including also times when the vehicle makes a turn, and can improve durability by allowing large tensile tension to act with respect to the carcass body portion in the vicinity of the tire shoulder portion whose radius of curvature is R2 and the vicinity of the tire sidewall portion whose radius of curvature is R3.

The sum total of the tensile tension acting on the carcass ply when internal pressure is being applied to the tire is decided by the internal pressure, so if the tensile tension is increased only in part, the tensile tension in sections other than that becomes smaller. By setting the carcass line (the curvature of each portion of the carcass body portion) in consideration of compressive tension acting on each portion of the carcass ply at times when the tire is under a load and at times when the vehicle makes a turn like in the present invention, the strength of the carcass line can be ensured, durability with respect to high applied loads can be enhanced, and the input of compressive force with respect to the carcass ply can be suppressed without increasing mass and cost.

A second aspect of the present invention is the agricultural tire pertaining to the first aspect, wherein in the belt layers, belt cord angles, with respect to the tire equatorial plane, of a first layer belt on the radial direction innermost side and a second layer belt on the outer side of the first layer belt cross each other at 10° to 30°.

In the agricultural tire pertaining to the second aspect, the belt cord angles in the belt layers are smaller than the belt cord angles used in passenger car tires and become closer to the tire circumferential direction, so tire radial direction deformation of the tire crown portion can be suppressed because of a hoop effect in the tire circumferential direction.

Advantageous Effects of Invention

As described above, according to the agricultural tire pertaining to the first aspect of the invention, there is obtained the superior effect that the strength of the carcass line can be ensured, durability with respect to a high applied load can be enhanced, and the input of a compressive force with respect to the carcass ply can be suppressed without increasing mass and cost.

According to the agricultural tire pertaining to the second aspect, there is obtained the superior effect that tire radial direction deformation of the tire crown portion can be suppressed.

BRIEF DESCRIPTION OF DRAWING

FIG. 1 is a cross-sectional view showing an agricultural tire on one side of a tire equatorial plane CL.

DESCRIPTION OF EMBODIMENT

An embodiment of the present invention will be described below on the basis of the drawing. In FIG. 1, an agricultural tire 10 pertaining to the present embodiment has an aspect ratio of 65% to 75% and has at least one carcass ply 12, at least two belt layers 14, and a tread portion 16.

Steel cords (not shown in the drawing) are used as carcass cords in the carcass ply 12, and the carcass ply 12 has a carcass body portion 22 that toroidally bridges bead portions 18 on both tire axial direction sides and has turn-up portions 24 that are turned up on outer sides of bead cores 20 in the bead portions 18. The turn-up portions 24 extend to, and terminate at, maximum width positions of tire sidewall portions 28, for example.

When, in a no-load state in which the agricultural tire 10 is mounted on a normal rim and no internal pressure is being applied to the tire, W denotes a distance from a tire equatorial plane CL to a tire axial direction outermost point P of the carcass body portion 22, D denotes a tire radial direction height from bead base portions 30 to a carcass body portion 224 at the tire equatorial plane CL, R1 denotes a radius of curvature of the carcass ply 12 in a range from the tire equatorial plane CL to a position P1 located 0.6 W away from the tire equatorial plane CL in the tire axial direction, R2 denotes a radius of curvature of the carcass body portion 22 in a range from the position P1 to a position P2 located 0.7 D on the tire radial direction outer side from the bead base portions 30, and R3 denotes a radius of curvature of the carcass body portion 22 in a range from the position P2 to a position P3 located 0.3 D on the tire radial direction outer side from the bead base portions 30, and R1, R2, and R3 are such that $0.07 \leq R2/R1 \leq 0.11$ and $0.5 \leq R2/R3 \leq 0.7$.

Here, the reason R2/R1—which is the radius of curvature R2 of a carcass body portion 22B in the vicinity of a tire shoulder portion 26 divided by the radius of curvature R1 of the carcass body portion 22A in the vicinity of the tire equatorial plane CL—is made equal to or greater than 0.07 is because when R2/R1 is less than 0.07, the radius of curvature R2 in the vicinity of the tire shoulder portion 26 ends up becoming relatively smaller, and tensile force acting with respect to the carcass body portion 22B in the vicinity of the tire shoulder portion 26 when internal pressure is being applied to the tire becomes smaller. In this case, because of bending force produced by deformation of the tire caused by a vertical direction load, eventually compressive force acts on the section inside the bend of the carcass body portion 22B in the vicinity of the tire shoulder portion 26 and causes fracturing of the carcass ply 12 in the vicinity of the tire shoulder portion 26.

Further, the reason R2/R1 is made equal to or less than 0.11 is because when R2/R1 exceeds 0.11, conversely the radius of curvature R1 of the carcass body portion 22 in the vicinity of the tire equatorial plane CL ends up becoming relatively smaller, and tensile force acting with respect to the carcass body portion 22A in the vicinity of the tire equatorial plane CL when internal pressure is being applied to the tire becomes smaller. In this case, because of lateral force produced at times when the vehicle makes a turn, eventually compressive force acts on the carcass body portion 22A in the vicinity of the tire equatorial plane CL and causes fracturing of the carcass ply 12 in the vicinity of the tire equatorial plane CL.

Next, the reason R2/R3—which is the radius of curvature R2 of the carcass body portion 22B in the vicinity of the tire shoulder portion 26 divided by the radius of curvature R3 of a carcass body portion 22C in the vicinity of the tire sidewall portion 28—is made equal to or greater than 0.5 is because when R2/R3 is less than 0.5, the radius of curvature R2 in the vicinity of the tire shoulder portion 26 ends up becoming relatively smaller, and tensile force acting with respect to the carcass body portion 22B in the vicinity of the tire shoulder portion 26 when internal pressure is being applied to the tire becomes smaller. In this case, because of the bending force produced by the deformation of the tire caused by the vertical direction load, eventually compressive force acts on the section inside the bend of the carcass body portion 22B in the vicinity of the tire shoulder portion 26 and causes fracturing of the carcass ply 12 in the vicinity of the tire shoulder portion 26.

Further, the reason R2/R3 is made equal to or less than 0.7 is because when R2/R3 exceeds 0.7, conversely the radius of curvature R3 in the vicinity of the tire sidewall portion 28 ends up becoming relatively smaller, and tensile force acting with respect to the carcass body portion 22C in the vicinity of the tire sidewall portion 28 when internal pressure is being applied to the tire becomes smaller. In this case, because of the vertical direction load, eventually compressive force acts on the carcass body portion 22C in the vicinity of the tire sidewall portion 28 and causes fracturing of the carcass ply 12 in the vicinity of the tire sidewall portion 28.

In the present embodiment, "normal rim" means a standard rim of an applicable size specified in the 2010 YEAR BOOK published by the Tire and Rim Association, Inc. (TRA) of the United States. "Normal load" and "normal internal pressure" mean maximum load and air pressure with respect to the maximum load in an applicable size and ply rating specified in the same YEAR BOOK. In cases where JATMA standards or ETRTO standards are applied in the place of use or the place of manufacture, those standards are followed.

Air is used to apply internal pressure to the tire, but it is also possible to substitute an inert gas, such as nitrogen gas, or the like for the air.

Next, steel cords (not shown in the drawing) are used as belt cords in the belt layers 14, and the belt layers 14 are disposed on the tire radial direction outer side of a crown region of the carcass ply 12. Although it is not shown in the drawing, in the belt layers 14, belt cord angles, with respect to the tire equatorial plane CL, of a first layer belt 31 on the radial direction innermost side and a second layer belt 32 on the outer side of the first layer belt 31 cross each other at 10° to 30°.

The tread portion 16 is disposed on the tire radial direction outer side of the belt layers 14. A sum total of a surface area of a tire pattern (not shown in the drawing) in the tread portion 16 is equal to or less than 40% of a product of a tread width and a tire perimeter.

Here, "tread width" means the maximum width, in the tire axial direction, of the tire contact surface when the agricultural tire 10 is placed perpendicularly with respect to a flat plate (not shown in the drawing) and the normal load is applied in a state in which the tire has been mounted on the normal rim, the tire has been inflated to the normal internal pressure, and the tire is at rest.

(Action)

The present embodiment is configured as described above, and the action thereof will be described below. When forces acting on a tire are separated in the tire circumferential direction, the tire radial direction, and the tire width direction, the forces in the tire circumferential direction are mainly produced by the driving/braking force of the vehicle, the forces in the tire radial direction are mainly produced by the internal pressure applied to the tire and the vertical direction load resulting from the weight of the vehicle, and the forces in the tire width direction are produced by the internal pressure applied to the tire and lateral force at times when the vehicle makes a turn.

The forces in the tire circumferential direction act substantially perpendicularly with respect to the carcass ply 12, so they do not produce tensile or compressive force with respect to the carcass ply 12.

The forces in the tire radial direction produce tensile and compressive force in the vicinity of the tire sidewall portion 28, and particularly the vertical direction load produced by the weight of the vehicle produces compressive force in the carcass ply 12. This acts greatly in the range of 30% to 70% of the tire radial direction height D of the carcass body portion 22A at the tire equatorial plane CL, that is, at the position where the carcass line of the carcass body portion 22 extends in the tire radial direction.

The forces in the tire width direction produce tensile and compressive force in the vicinity of the tire equatorial plane CL, and particularly lateral force at times when the vehicle makes a turn produces compressive force in the carcass body portion 22A in the vicinity of the tire equatorial plane CL. This acts greatly right under the tread portion 16, where the tire comes into contact with road surfaces, and in the range of 0% to 60% of the distance W from the tire equatorial plane CL to the tire axial direction outermost point of the carcass body portion 22, that is, at the position where the carcass line of the carcass body portion 22 extends in the tire axial direction.

Further, the tire deforms because of the internal pressure applied to the tire and the vertical direction load, and bending force also acts on the carcass ply 12. The bending stress of the carcass ply 12 (the carcass body portion 22) generally becomes a maximum in the vicinity of the tire sidewall portion 28 from the tire shoulder portion 26.

The agricultural tire 10 pertaining to the present embodiment can mitigate the input of compression to the carcass ply 12 at times when the vehicle makes a turn and can improve turning durability by allowing large tensile tension to act with respect to the carcass body portion 22A in the vicinity of the tire equatorial plane CL whose radius of curvature is R1. Further, the agricultural tire 10 can mitigate the input of compression to the carcass ply 12 (the carcass body portion 22) during travel overall, including also times when the vehicle makes a turn, and can improve durability by allowing large tensile tension to act with respect to the carcass body portion 22B in the vicinity of the tire shoulder portion 26 whose radius of curvature is R2 and the carcass body portion 22C in the vicinity of the tire sidewall portion 28 whose radius of curvature is R3.

The sum total of the tensile tension acting on the carcass ply 12 when internal pressure is being applied to the tire is decided by the internal pressure, so if the tensile tension is increased only in part, the tensile tension in sections other than that becomes smaller. By setting the carcass line (the curvature of each portion of the carcass body portion 22) in consideration of compressive tension acting on each portion of the carcass ply 12 at times when the tire is under a load and at times when the vehicle makes a turn like in the present embodiment, the strength of the carcass line can be ensured, durability with respect to high applied loads can be enhanced, and the input of compressive force with respect to the carcass ply 12 can be suppressed without increasing mass and cost.

Moreover, the belt cord angles in the belt layers 14 are smaller than the belt cord angles used in passenger car tires and become closer to the tire circumferential direction, so tire radial direction deformation of the tire crown portion can be suppressed because of a hoop effect in the tire circumferential direction.

Test Examples

A test to evaluate carcass ply durability was performed in regard to a working example and comparative examples 1 to 6 of size 710/70R42 tires having the specifications shown in Table 1, and the results shown in Table 2 were obtained.

The evaluation of these tires was performed under the condition of the tires being mounted on DW23A×42 rims, and for a burst pressure test, the tire inner surfaces were filled with water and the water pressures when the tires burst were measured.

The carcass ply durability test was performed under the condition of the air pressure being 100 kPa in the drum test, the applied load was an applied load of TRA applied load (normal load)×1.2 times [kgf] corresponding to the air pressure (normal internal pressure), a 10-degree slip angle was added every 10 seconds right and left, and whether or not there was plastic deformation and fracturing of the carcass ply cords when the tire traveled 26,000 km at 16 km per hour was measured. When there was a failure before traveling 26,000 km, the distance traveled until the failure and whether or not there was plastic deformation and fracturing of the ply cords at the time of the failure were measured.

The numerical values of the tire burst pressures and tire masses in Table 1 are shown using indexes where 100 represents the working example.

According to Table 2, it is clear that with the working example tire, it is possible, without lowering the tire burst pressure or increasing the weight of the tire, to improve carcass ply durability by increasing the tensile stress acting on the carcass ply and reducing bending stress.

TABLE 1

|  | Carcass Ply Cord Material | Number of Carcass Plies | R2/R1 | R2/R3 |
| --- | --- | --- | --- | --- |
| Working Example | Steel | 1 | 0.08 | 0.6 |
| Comparative Example 1 | Nylon | 3 | 0.08 | 0.6 |
| Comparative Example 2 | Nylon | 6 | 0.08 | 0.6 |
| Comparative Example 3 | Steel | 1 | 0.06 | 0.6 |
| Comparative Example 4 | Steel | 1 | 0.12 | 0.6 |
| Comparative Example 5 | Steel | 1 | 0.08 | 0.4 |
| Comparative Example 6 | Steel | 1 | 0.08 | 0.8 |

TABLE 2

|  | Tire Burst Pressure | Tire Mass | Drum Test Travel Distance | Carcass Ply Deformation |
| --- | --- | --- | --- | --- |
| Working Example | 100 | 100 | Completed | None |
| Comparative Example 1 | 46 | 100 | Completed | None |
| Comparative Example 2 | 92 | 110 | Completed | None |
| Comparative Example 3 | 100 | 100 | 8,000 km | Ply Cord Bending in Vicinity of Shoulder Portion |
| Comparative Example 4 | 100 | 100 | Completed | Ply Cord Bending in Vicinity of Tire Equatorial Plane |
| Comparative Example 5 | 100 | 100 | 8,000 km | Ply Cord Bending in Vicinity of Shoulder Portion |
| Comparative Example 6 | 100 | 100 | 12,000 km | Ply Cord Bending in Vicinity of Tire Sidewall Portion |

REFERENCE SIGNS LIST

10 Agricultural Tire
12 Carcass Ply

14 Belt Layers
16 Tread Portion
18 Bead Portion
22 Carcass Body Portion
22A Carcass Body Portion
22B Carcass Body Portion
22C Carcass Body Portion
30 Bead Base Portion
31 First Layer Belt
32 Second Layer Belt
CL Tire Equatorial Plane
D Tire radial Direction Height
P Tire Axial Direction Outermost Point
P1 Position
P2 Position
P3 Position
R1 Radius of Curvature
R2 Radius of Curvature
R3 Radius of Curvature
W Distance

The invention claimed is:
1. An agricultural tire comprising:
at least one carcass ply in which steel cords are used as carcass cords and which has a carcass body portion that toroidally bridges bead portions on both tire axial direction sides and has turn-up portions that are turned up on outer sides in the bead portions;
at least two belt layers in which steel cords are used as belt cords and which are disposed on a tire radial direction outer side of a crown region of the carcass ply; and
a tread portion that is disposed on the tire radial direction outer side of the belt layers,
wherein
a sum total of a surface area of a tire pattern is equal to or less than 40% of a product of a tire tread width and a tire perimeter,
the tire has an aspect ratio of 65% to 75%, and
when, in a no-load state in which the tire is mounted on a normal rim and no internal pressure is being applied to the tire, W denotes a distance from a tire equatorial plane to a tire axial direction outermost point of the carcass body portion, D denotes a tire radial direction height from bead base portions to the carcass body portion at the tire equatorial plane, R1 denotes a radius of curvature of the carcass ply in a range from the tire equatorial plane to a position P1 located 0.6 W away from the tire equatorial plane in the tire axial direction, R2 denotes a radius of curvature of the carcass body portion in a range from the position P1 to a position P2 located 0.7 D on the tire radial direction outer side from the bead base portions, and R3 denotes a radius of curvature of the carcass body portion in a range from the position P2 to a position P3 located 0.3 D on the tire radial direction outer side from the bead base portions, and R1, R2, and R3 are such that $0.07 \leq R2/R1 \leq 0.11$ and $0.5 \leq R2/R3 \leq 0.7$.

2. The agricultural tire according to claim 1, wherein, in the belt layers, belt cord angles, with respect to the tire equatorial plane, of a first layer belt on the radial direction innermost side and a second layer belt on the outer side of the first layer belt cross each other at 10° to 30°.

* * * * *